(12) United States Patent
Burger (10) Patent No.: US 11,215,731 B2
(45) Date of Patent: Jan. 4, 2022

(54) AUTOMATIC DETECTION OF MANIPULATED METAL OBJECTS IN X-RAY IMAGES

(71) Applicant: SMITHS HEIMANN GMBH, Wiesbaden (DE)

(72) Inventor: Karsten Burger, Wiesbaden (DE)

(73) Assignee: SMITHS HEIMANN GMBH, Wiesbaden (DE)

( * ) Notice: Subject to any disclaimer, the term of this patent is extended or adjusted under 35 U.S.C. 154(b) by 0 days.

(21) Appl. No.: 17/046,883

(22) PCT Filed: Apr. 11, 2019

(86) PCT No.: PCT/EP2019/059254
§ 371 (c)(1),
(2) Date: Oct. 12, 2020

(87) PCT Pub. No.: WO2019/197531
PCT Pub. Date: Oct. 17, 2019

(65) Prior Publication Data
US 2021/0149073 A1     May 20, 2021

(30) Foreign Application Priority Data
Apr. 12, 2018   (DE) .......................... 102018108683.0

(51) Int. Cl.
*G01V 5/00*   (2006.01)
*G01N 23/04*  (2018.01)

(52) U.S. Cl.
CPC ........... *G01V 5/0016* (2013.01); *G01N 23/04* (2013.01)

(58) Field of Classification Search
CPC .............................. G01N 23/04; G01V 5/0016
See application file for complete search history.

(56) References Cited

U.S. PATENT DOCUMENTS

| 4,539,648 A | 9/1985 | Schatzki |
| 7,020,241 B2 | 3/2006 | Beneke et al. |
| (Continued) | | |

OTHER PUBLICATIONS

International Search Report, PCT/EP2019/059254, dated Jun. 18, 2019, 10 pages.

(Continued)

*Primary Examiner* — Michael C Bryant
(74) *Attorney, Agent, or Firm* — Armstrong Teasdale LLP (57) ABSTRACT

The disclosure relates to a method for detecting a tampered metal item (FC), in which a non-metallic substance is concealed and which has been tampered with in such a way that the tampered metal item (FC) produces a two-dimensional X-ray image comparable to a corresponding non-tampered metal item, in two-dimensional X-ray data of an inspection object (O1, O2, O3) containing the metal item (FC), the method including (S10) determining a region containing a metal item (FC), (S20) providing an attenuation curve (D(r)) for or intensity curve (I(r)) of detected X-ray radiation along a line (L) through said metal item (FC), (S30) evaluating whether the attenuation curve (D(r)) or the intensity curve (I(r)) shows a characteristic anomaly (P1, P2) in a predetermined area, and when the attenuation curve (D(r)) or the intensity curve (I(r)) in the predetermined range shows the characteristic anomaly (P1, P2), (S40) triggering an alarm function.

14 Claims, 7 Drawing Sheets

(56) References Cited

U.S. PATENT DOCUMENTS

| | | |
|---|---|---|
| 2011/0206240 A1 | 8/2011 | Hong et al. |
| 2011/0246769 A1* | 10/2011 | Wilson .................. G06F 21/86 |
| | | 713/168 |
| 2014/0185755 A1 | 7/2014 | Bendahan |
| 2016/0084984 A1 | 3/2016 | Franco et al. |

OTHER PUBLICATIONS

C. Endt et al.: "Die Größe ist entscheidend", Süddeutsche Zeitung, May 17, 2017 (May 17, 2017).

* cited by examiner

AUTOMATIC DETECTION OF MANIPULATED METAL OBJECTS IN X-RAY IMAGES

CROSS-REFERENCE TO RELATED APPLICATIONS

This patent application is a National Stage Entry of PCT/EP2019/059254 filed on Apr. 11, 2019, which claims priority to DE Application No. 10 2018 108 683.0 filed on Apr. 12, 2018, the disclosures of which are hereby incorporated by reference herein in their entirety as part of the present application.

BACKGROUND

The present disclosure generally concerns the non-destructive inspection of objects and the detection of potentially dangerous items contained therein. In particular, the disclosure relates to the detection of items tampered to conceal hazardous substances, such as battery or accumulator cells, which have been modified to conceal a hazardous substance, for example an explosive or drugs against detection.

The following introductory description serves only for a better understanding of the disclosure and should under no circumstances be understood as admitted prior art unless it is expressly designated as such.

It has become known (e.g. C. Endt et al. in "Die Größe ist entscheidend" ("Size matters"), Süddeutsche Zeitung of May 17, 2017) that it is difficult, if not impossible, to detect within a transmissive image an inherently dangerous organic explosive hidden in an per se harmless metallic item. That is to say, the dangerous item "explosive" in the X-ray image for optically oriented analysis is currently hardly or no longer distinguishable from the environment in a mimesis-like manner. In concrete terms, this means that explosives could already be concealed in battery cells or accumulator cells—which are not dangerous in themselves—of a mobile electronic device.

In the following, we will only talk about accumulator cells (i.e. rechargeable battery cells), without excluding batteries as primary cells. Batteries of mobile devices, such as laptops, today are mainly lithium-ion accumulators (here lithium accumulators for short). To conceal an explosive in one or more accumulator cells of a accumulator pack, either a part of the interior or the entire interior of one or more accumulator cells is replaced with the explosive. This ensures that such a accumulator pack with tampered or incorrect accumulator cells can still supply the mobile device with sufficient power for a functionality test.

X-ray-based inspection of hand luggage at airports usually only generates two-dimensional X-ray images of the luggage to be inspected. When inspecting baggage destined for the cargo compartment of an aircraft, it is common practice today to use computer tomography methods that reliably detect explosives. Inspection systems at security checkpoints for hand baggage screening, which show a two-dimensional X-ray image to an operator, should therefore be improved for the detection of hidden explosives.

US 2016 00 84 984 A1 discloses a system and method for locating lithium batteries in inspection objects. This is sufficient if the only purpose is to detect the presence of lithium batteries or batteries that look like lithium batteries. However, this is not a solution if it is only about finding tampered accumulator cells. The implementation of this known system and method would require a closer examination of every mobile device with accumulator cells to exclude explosives hidden in them, or to generally exclude the carrying of the respective mobile devices on board an aircraft. Neither one method is suitable for practical use.

US 2011 02 06 240 A1 also concerns the detection of potentially threatening items that may be concealed inside objects such as portable electronic devices, where an inspection object is subjected to a computer tomography (CT) imaging process and 3D CT data of the inspection object is obtained. During the analysis of the CT data, an item to be examined more closely, such as a lap-top, for example, in a piece of luggage, is first identified as an inspection object. This object is then subdivided into partitions to be further examined by generating one-dimensional self-projections of the CT data. Thereby feature vectors of these partitions and the CT image data are used to generate layout feature vectors. One or more layout feature vectors are then compared with training data for threat-containing versus non-threat-containing items from a class of the imaged item to determine if the imaged item contains a threat.

U.S. Pat. No. 4,539,648 A reveals an imaging X-ray inspection system for inspection objects to detect agricultural contraband contained in an inspection object (e.g., a piece of baggage or parcel). Optionally, the imaging of items with a circular cross-section is to be improved in order to better distinguish these items from items with a rectangular cross-section. Based on the assumption that the items are surrounded by a material having a different density absorption coefficient product than the items, it is proposed to calculate a gradient image of the spatially resolved intensity of the X-ray radiation transmitted by the inspection object in order to remove the edges of the items with rectangular cross-section in the X-ray image based on this.

BRIEF DESCRIPTION

An X-ray inspection system and an X-ray inspection method may be desired by means of which the detection of tampered, basically metallic items, such as accumulator cells, in particular lithium cells, in which an organic hazardous substance, for example an explosive, has been hidden, is improved or at least made possible at all.

Features and details which are defined in connection with the X-ray inspection method according to the disclosure are also valid in connection with the X-ray inspection device according to the disclosure, and vice versa. Therefore, the disclosure of the individual aspects is mutually related.

In order to find the technical solution according to the disclosure, several technical considerations had to be made.

Usually, a lithium cell has a cylindrical shape with a thin jacket of a metal foil and includes internally the known functional materials (for example, aluminum, metallic lithium oxide, a highly porous separator, carbon, and copper). If the interior of such a lithium cell is tampered with by filling the cell completely or partially with an organic explosive, this tampered with cell will produce a different X-ray image compared to a real lithium cell. The attenuation of X-ray radiation by the real lithium cell is higher than that by organic materials, such as an explosive, due to its predominantly metallic components. For a tampered with cell, the X-ray image would therefore be significantly different from that expected from a lithium cell due to the organic explosives content and would therefore be conspicuous to an operator in the X-ray image.

In order to compensate for the lack of attenuation properties of a tampered cell, it can be made with a much thicker metal jacket so that the resulting transmission-based X-ray image of the tampered cell looks like that of an ordinary lithium cell. If the metal jacket is designed with a uniform thickness, i.e. as a sleeve of uniform thickness, the resulting X-ray image can also look equally realistic in all viewing directions in an X-ray inspection system with several transmission directions (so-called multi-view device). This is problematic.

Such a tampered cell is called a "fake cell" here. A fake cell is a tampered accumulator or battery cell in which a material foreign to the cell's actual function has been concealed in the cell and the cell has been tampered with in such a way that the cell looks as much as possible like a real accumulator or battery cell in an X-ray image.

The inventor(s) recognized in an X-ray image of the attenuation or intensity curve of detected X-ray radiation through a fake cell that characteristic features of non-tampered cells and especially characteristic anomalies of fake cells can be detected. Especially suitable is an attenuation or intensity curve of detected X-ray radiation that is to be analyzed and that runs as crosswise as possible through a battery cell, i.e. orthogonal to its longitudinal axis.

For example, it has been found that the metallic sheath or sleeve of a fake cell in an X-ray image causes a characteristic peak at the edges of the fake cell in the attenuation curve or correspondingly in the intensity curve through the fake cell. This results from the fact that the metallic sheath or sleeve is irradiated by X-ray radiation tangentially and not vertically at the edge of the cell. As a result, the X-ray radiation are attenuated much more strongly at the edge of the cell, especially in the edge area defined by the metallic sheath or sleeve, than in the area of the fake cell between the edge areas defined by the metallic sheath or sleeve, since there it is irradiated vertically through the metallic sheath or sleeve and thus through less metal than in the edge areas and the X-ray radiation are therefore effectively attenuated less. This effect is all the more significant the thicker the metallic cell jacket, i.e. the metallic sheath or sleeve. This is exactly the case with fake cells, since the lack of attenuation by an organic hazardous material, such as explosives, is to be compensated by more metal in the cell jacket.

Eventually, during the development of the solution outlined above, it became clear that an important goal was also to find a sufficiently robust method for the detection of fake cells. In real x-ray images a variety of disturbances occur, i.e. the cells to be analyzed are not ideally isolated, but are, for example, stacked differently, laptop parts and cables may overlay the cells, metal sleeves of fake cells and real cells may have different sizes. The principle proposed here, on which the developed detection method is based, is explained here using idealized examples. In this respect, the X-ray images and drawings shown could be misleading in themselves, since the cells analyzed in each case are "exposed".

It should be noted that the inventive principle is not limited to the detection of fake cells containing explosives. Rather, the principle is applicable to the detection of any tampered metallic items in which an organic material has been hidden. The organic material can also be drugs, for example. Therefore, in the following the term "fake cell(s)" shall not be understood limited but shall generally be used as a surrogate for any kind of fake item tampered with according to the same principle.

The core idea of the disclosure is to use the above findings for detecting metallic fake cells in an X-ray inspection procedure, in particular in an evaluation procedure for detecting fake cells in a transmission image of an inspection object, such as a two-dimensional X-ray image.

A first aspect of the present disclosure relates to a method for detecting a tampered metal item, in which a non-metallic substance is concealed, in two-dimensional (2D) transmission data, in particular 2D X-ray data, of an inspection object containing the item. For example, the metal item may be tampered in such a way that the tampered metal item produces a transmission image comparable to a corresponding non-tampered metal item, for example a 2D X-ray image. 2D transmission data may be data that has been acquired by irradiating the inspection object in one spatial dimension along a second spatial dimension and sensing the radiation not absorbed by the inspection object. In the case of 2D X-ray data, these are the attenuation values or intensity values for X-ray radiation always sensed along a transport direction for one (or more) line(s). Of course, 2D transmission data can also be derived from three-dimensional (3D) transmission data acquired for spatial elements of the inspection object and used for the procedure presented here.

The method includes the following steps: Determining an area containing a metal item in the X-ray data; providing an attenuation curve for or intensity curve of detected X-ray radiation (which have passed through the inspection object) along a line through the metal item from the X-ray data; evaluating whether the attenuation curve or intensity curve shows a characteristic anomaly in a predetermined area, for example at edges or in marginal areas of the metal item; and if the attenuation curve or intensity curve shows the characteristic anomaly in the predetermined area, triggering an alarm function.

Determining the area containing the metal item in the X-ray data may include: Determining that an area in the X-ray data contains metal based on whether the area substantially causes a minimum attenuation of the X-ray radiation and/or on what atomic number or effective atomic number (Z-value or Z-effective) is assigned to a material in the X-ray data.

Providing the attenuation curve or intensity curve along the line through the metal item from the X-ray data may include: Determining a longitudinal direction of the metal item; and providing the attenuation curve or intensity curve along the line through the metal item. The line may be aligned so that it is orthogonal to the longitudinal direction determined.

Evaluating whether the attenuation curve or corresponding intensity curve shows a characteristic anomaly in the predetermined area may include at least one of the following steps (a)-(d). It is clear that the intensity curve is essentially complementary to the attenuation curve and therefore all steps for the attenuation curve can be applied accordingly to the intensity curve taking this into account.

Step (a): Determining whether the value of the attenuation increases along the attenuation curve from the edge of the metal item to the center of the metal item.

Step (b): Determining whether the attenuation curve has a step (jump) at the edges or in the peripheral areas of the metal item.

Step (c): Determining whether the attenuation curve has a maximum attenuation at the edges of the metal item and, based thereon, decreases toward the center of the metal item and/or runs at a low level compared to the edges.

Step (d): Determining a first derivative of the attenuation curve according by the location and determining whether the derivative shows a peak in each of the edge areas of the metal item.

In connection with the measures explained above, but also for the entire document at hand, it should be noted that "edge area" is understood here to mean an area starting from the edge of the metal item towards the center of the metal item, wherein the edge area may be defined by about 10% of the distance from the edge to the center.

The attenuation curve or the corresponding intensity curve as profile signals can be evaluated with different methods, e.g. by machine learning, to recognize or detect a characteristic anomaly, wherein "artificial" knowledge by experience is stored in the system. In principle, the system learns patterns and regularities in the learning data by means of presented examples of fake cells to be recognized, wherein the knowledge about the examples is generalized after the learning phase. As a result, the system can not only recognize the presented examples, but also evaluate unknown, i.e. new data. The principles of machine learning are known to the expert in this field and therefore need not be explained in detail here.

Triggering an alarm function has at least one of the following steps (i)-(iii)

Step (i): Overlaying the attenuation curve or the intensity curve and the line along which the attenuation curve or the intensity curve is present into an X-ray image of the inspection object.

Step (ii): Triggering a manual inspection of the inspection object.

Step (iii): Triggering of a visual and/or acoustic alarm at an inspection system where the method is implemented.

The metal item may be an item with a metal sleeve or metal cover. Moreover, the tampered metal item may be a tampered accumulator cell or battery cell (fake cell), for example a tampered lithium battery cell.

A second aspect of the present disclosure concerns a processing device for the evaluation of transmission images, the processing device including a computer unit. The computer unit is adapted to perform a method according to the first aspect of the present disclosure.

The processing device may include an output unit which is arranged to perform an alarm function.

The computer unit may have a communication interface by means of which the computer unit can be networked with one or more inspection devices for non-destructive inspection of inspection objects for data communication in order to receive X-ray images from the one or more inspection devices for (e.g., visual) evaluation by means of data communication.

A third aspect of the present disclosure concerns an inspection device which is arranged for transporting inspection objects through the inspection device, for carrying out an imaging inspection method for non-destructive inspection of the inspection objects and for providing transmission images of the inspection objects to a processing device according to the second aspect of the present disclosure and is connected to the processing device for data communication.

A fourth aspect of the present disclosure concerns an inspection system with at least one processing device according to the second aspect of the present disclosure, which is spatially separately connected to at least one inspection device according to the third aspect of the present disclosure for data communication, wherein transmission images of inspection objects inspected at the at least one inspection device are transmitted to the processing device for visual evaluation.

A fifth aspect of the present disclosure relates to a computer program product including a computer program having software means for carrying out a method according to the first aspect of the present disclosure when the computer program is executed on a computer, in particular on a processing device according to the second aspect of the present disclosure.

A sixth aspect of the present disclosure concerns a data carrier containing a computer program product according to the fifth aspect of the present disclosure.

A seventh aspect of the present disclosure concerns a data stream with electronically readable control signals which can interact with a programmable computer in such a way that when the computer executes the electronically readable control signals, the computer carries out a method according to the first aspect of the present disclosure.

BRIEF DESCRIPTION OF THE DRAWINGS

Further advantages, features and details of the disclosure result from the following description, in which examples of the disclosure are described in detail with reference to drawings. The features mentioned in the claims and in the description may be essential to the invention individually or in any combination. Likewise, the features mentioned above and the features further elaborated here may each be used individually or in combination with several others in any desired combination. Parts or components with similar or identical functions are partly denoted with identical reference marks. The terms "left", "right", "top" and "bottom" used in the description of the design examples refer to the drawings in an alignment with normally readable Figure designation or normally readable reference signs. The embodiments shown and described are not to be understood as exhaustive but have an exemplary character to explain the disclosure. The detailed description is intended to inform the skilled person, therefore, known structures and processes are not shown or explained in detail in the description in order not to complicate the understanding of the present description.

DETAILED DESCRIPTION

Figure 1:
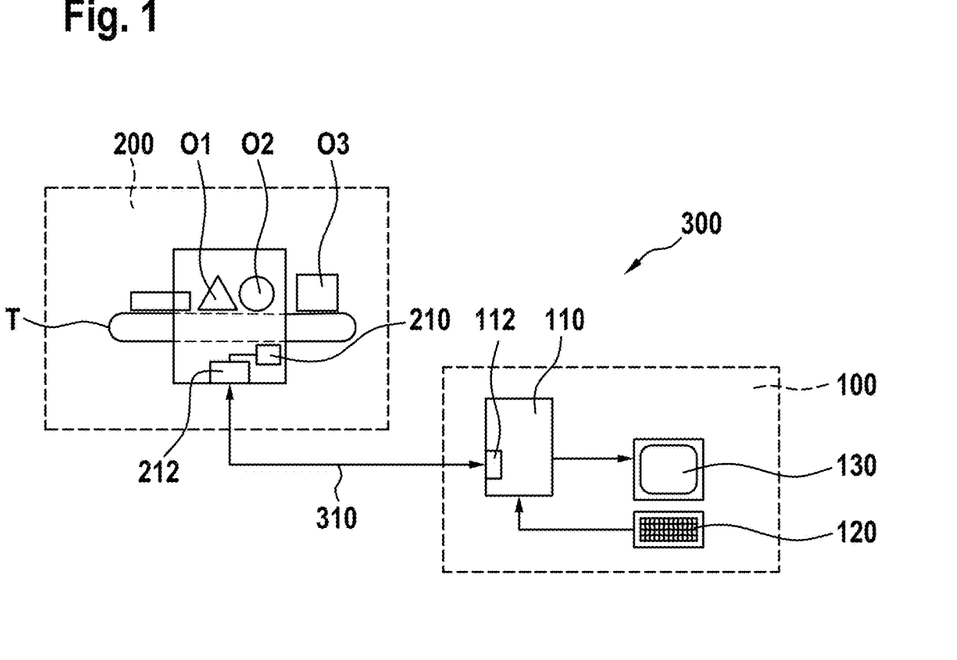
FIG. 1 shows a simplified block diagram of an inspection system with a processing device for the evaluation of transmission images of inspection objects.

FIG. 1 shows a simplified block diagram of an inspection system 300 with an evaluation device 100 for the evaluation of transmission images B1 (FIG. 3), B2 (FIG. 4), B3 (FIG. 5), B4 (FIG. 6A) and B5 (FIG. 6B) of inspection objects O1, O2, O3. The inspection objects O1, O2, O3 in FIG. 1 are only shown symbolically for simplification.

The evaluation device 100 can essentially be a workstation for one operator and includes a processing unit 110, an input unit 120 and an output unit 130.

The output unit 130 has been set up to display transmission images to the operator, e.g. the transmission images B1 (FIG. 3), B2 (FIG. 4) and B3 (FIG. 5) of the inspection objects O1, O2, O3, in order to inspect the contents of the inspection objects O1, O2, O3 for the presence of target items. Target items can be dangerous items such as weapons, explosives, dangerous liquids and/or contraband and/or drugs etc. In the present context it is particularly important to find hazardous substances, especially explosives, hidden in metallic items that are not dangerous per se. As already described elsewhere, it is possible to tamper with or fake a harmless metallic item in such a way that the tampered with or faked item (fake item) is shown in a two-dimensional X-ray image similar or nearly identical to the real, i.e. not tampered with, item. This can affect the detection rate accordingly. In order to improve or facilitate the detection of such fake items, suitable measures are described here using tampered or faked battery or accumulator cells as an example.

An important part of the task was to find a sufficiently robust method, because in the real image a variety of disturbances can occur, e.g. the cells can be stacked differently, laptop parts and cables can overlap, the sleeves and cells can have different sizes and types; in this respect the images/drawings could be misleading in themselves, since there the cells "lie free";

The input unit 120 in FIG. 1 is basically set up to enter the operator's input to control the evaluation device 100. Furthermore, the operator can enter the result of the visual evaluation in response to a displayed transmission image B1, B2, B3, e.g. that the inspection object O1, O2, O3 is "safe" or that the contents of the inspection object O1, O2, O3 must be further examined, especially if it has to be examined manually. A more detailed investigation can also be triggered automatically by the processing unit 110 by means of an alarm function, for example to examine the object concerned for traces of explosives in a more detailed investigation (explosive trace detection, ETD). Such a measure is time-consuming and costly and should therefore only be necessary in cases where there is a well-founded reason to do so.

The transmission images B1 (FIG. 3), B2 (FIG. 4) and B3 (FIG. 5) of the inspection objects O1, O2, O3 were generated by the Inspection device 200 (FIG. 1) by means of an imaging technique. In the embodiment, the inspection device 200 is an X-ray inspection device as known from DE 101 49 254 A1. The X-ray inspection device can have one or more radiation planes.

The inspection device 200 is basically designed for the transport of the inspection objects O1, O2, O3 through the inspection device 200 by means of a transport device T, for example a conveyor belt. Inside the inspection device 200, the inspection objects O1, O2, O3 are non-destructively X-rayed in a known manner. As a result, the inspection device 200 generates two-dimensional X-ray data of the inspection objects O1, O2, O3, from which 100 X-ray images can be generated at the evaluation device and displayed to the operator on the display unit 130.

Figure 2:
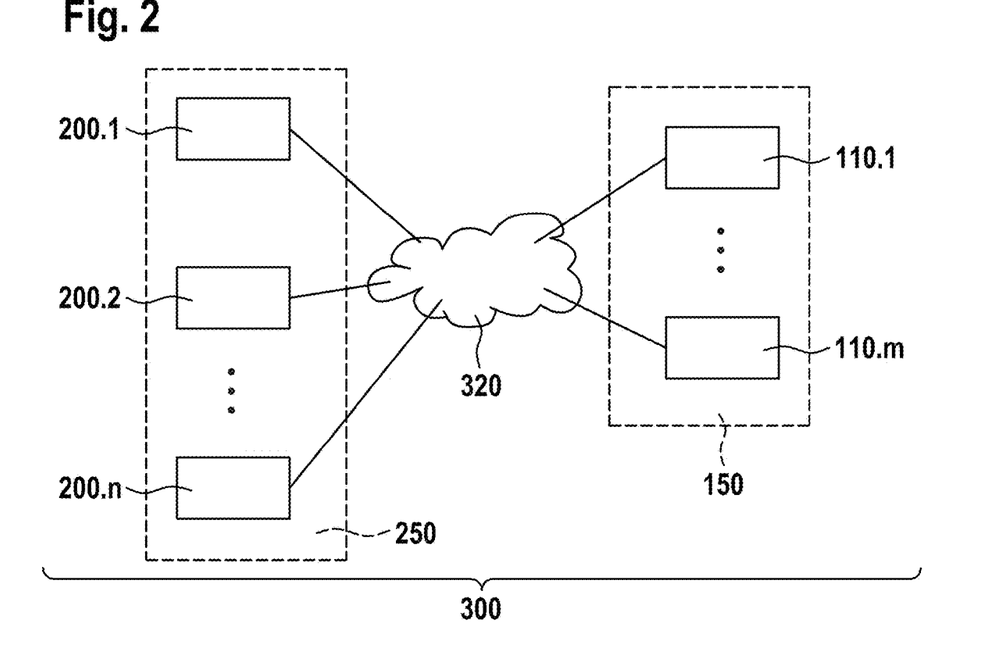
FIG. 2 shows an inspection system with several (n) inspection devices of FIG. 1 at one checkpoint and several (m) evaluation devices at a spatially separated evaluation point.

The evaluation device 100 in the embodiment as inspection system 300 of FIG. 1 is spatially separated from the inspection device 200 and connected to the inspection device 200 via a network connection 310 for data communication. For this purpose, the computer unit 110 is equipped with a first communication interface 112 and the inspection device 200 with a second communication interface 212, by means of which the computer unit 110 is connected to the one shown, but also to other inspection systems 200 for the non-destructive inspection of inspection objects via the network connection 310 for data communication. Via the network connection 310, acquired transmission data of inspection objects O1, O2, O3 inspected at the inspection device 200 are transmitted to the evaluation device 100 for evaluation. In addition to several inspection device 200, the inspection system 300 can also have several evaluation devices 100, so that the workload of the evaluation of the transmission data can be optimally distributed among the existing evaluation devices 100 (such a system is shown in FIG. 2). The evaluation device 100 can, of course, always be installed in close proximity to the inspection device 200 or as an integral part of the inspection device 200.

FIG. 2 shows an inspection system 300 with several (n) inspection devices 200.1, 200.2, . . . , 200.n of FIG. 1, which are located at one inspection point 250, and several (m) evaluation devices 100.1, . . . , 100.m of FIG. 1, which are located at an evaluation point 150 which is spatially separated from the inspection systems. The inspection devices 200.1, 200.2, . . . , 200.n of the inspection point 250 are connected via a data network 320 with the evaluation devices 100.1, . . . , 100.m of the evaluation point 150 for electronic data exchange in a known manner. Of course, several checkpoints 250 can also be networked with one or more evaluation points 150.

For example, checkpoint 250 can be a checkpoint at the entrance to an airport security area. At the checkpoint, the hand luggage of air passengers is inspected in a usual way using the inspection devices 200.1, 200.2, . . . , 200.n of the checkpoint 250. In the example, the X-ray data generated by one of the inspection devices 200.1, 200.2, . . . , 200.n are X-ray data of, for example, a piece of luggage as a passenger's inspection object. For evaluation, e.g. with regard to possible security risks or other items of interest, the X-ray data is transmitted via the network 320 to one of the evaluation devices 100.1, . . . , 100.m. There the X-ray data are used to generate X-ray images B1-B3 and to have them visually inspected by an operator.

If an inspection object contains an electronic mobile device with battery cells or accumulator cells, the operator is especially challenged. The operator has to decide whether the battery or accumulator cells of the mobile device may have been tampered with and therefore additional time-consuming and costly examinations must be requested. If unnecessary additional inspections can be avoided by more effective evaluation of the X-ray data at the evaluation device 100, unnecessary delays at the checkpoint 250 can be avoided and the entire inspection procedure improved. In addition, additional costs can be avoided.

FIG. 3 shows a first embodiment of the proposed improvement for the evaluation, especially the detection of possible fake items in inspection objects.

FIG. 3 shows in the upper part (a) a first X-ray image B1 of a tray W as a first inspection object O1. In the tray W there are two accumulator packs AP1, AP2, each including 9 cells.

The first accumulator pack AP1 includes an arrangement of 9 lithium cells LZ, three of which are connected in series and the three units with series-connected lithium cells are connected in parallel.

The second accumulator pack AP2 is basically identical to the first accumulator pack AP1 with regard to the connection of the lithium cells, but one unit with three cells connected in series includes three tampered lithium cells, which are referred to here as fake cells FZ. This means that the second accumulator pack AP2 has only ⅔ of the capacity of the first accumulator pack AP1 but is basically functional. Consequently, the second accumulator pack AP2 cannot be recognized by a functionality test of the mobile device containing this accumulator pack AP2 alone.

As already discussed elsewhere and shown in FIG. 3, a true lithium cell LZ has a cylindrical shape with a thin metal foil jacket and includes the known functional materials inside, such as an aluminum electrode coated with metallic lithium oxide and a copper electrode coated with carbon, the lithium oxide layer and the carbon layer both being arranged in an electrolyte and separated from each other by a highly porous separator.

If the inside of a tampered fake cell FZ is filled completely or partially with an organic explosive, such a fake cell FZ would produce a clearly recognizable different X-ray image compared to a real lithium cell LZ. The attenuation for X-ray radiation in the real lithium cell LZ is higher than the attenuation of a filling made of an organic material, such as an explosive, as is the case with the fake cell, due to its predominantly metallic components. In the case of a fake cell FK, the X-ray image would therefore be clearly distinguishable from the X-ray image of a real lithium cell LZ due to the organic explosive content and would therefore be easy for an operator to be recognized as conspicuous in the X-ray image B1.

In order to compensate for the missing attenuation properties of a fake cell FZ, it can be designed with a much thicker metal jacket, the material thickness of which is adjusted in such a way that the resulting transmission-based X-ray image of this fake cell FZ looks like that of an ordinary non-tampered lithium cell LZ.

If the metal jacket is designed with a uniform thickness, i.e. in the form of a sheath or sleeve with a uniform thickness, the resulting X-ray image can also look equally realistic in a multi-view X-ray inspection system in all directions of view acquired in the process. This is problematic, since FZ fake cells could remain undetected and explosives could possibly be smuggled into security areas by means of such fake cells.

The inventor(s) have recognized that fake cells FZ in an X-ray image show a characteristic anomaly in the attenuation curve along a line through the fake cell FZ, which makes it possible to automatically detect the possible presence of a fake cell FZ. Such an anomaly can be detected particularly well in the attenuation curve along a line L which is essentially transverse or orthogonal to a longitudinal direction LR of the fake cell(s) FZ.

The metallic cell jacket of the fake cell FZ causes a characteristic peak P1, P2 in the attenuation curve along the line L through the fake cells FZ in X-ray image B1, which occurs at the left edge R1 and at the right edge R2 of the fake cell FZ. The peak P1, P2 is due to the fact that at the cell edge R1, R2 the metal sheath or metal sleeve is radiated through tangentially and not vertically. As a result, the X-ray radiation passes through more metal at the edge of the cell R1, R2 and is therefore attenuated much more than in the area of the fake cell between the cell edges R1, R2. In the area between the cell edges R1, R2, the metal sleeve or metal sheath is essentially penetrated vertically and thus effectively less metal is irradiated. Accordingly, the X-ray radiation are less attenuated. This effect and thus the detectable anomaly are all the more significant the thicker the metal sleeve or metal sheath of the fake cell FZ is.

Thus, fake cells FZ can be found by searching for the anomaly described above. For the human eye, the anomaly is difficult to detect, especially due to the screen resolution, and therefore has not been detected until now.

In any case, the inventors have recognized that such an anomaly occurs especially in a fake cell FZ compared to a non-tampered lithium cell, because the lack of attenuation, especially of an organic hazardous material hidden therein, such as an explosive, has to be compensated by more metal in the cell casing.

In the lower part of FIG. 3 the above finding is shown by the attenuation curve $D(r)$ along the line L with the location variable r. For optimal analysis, the attenuation curve $D(r)$ may be examined transverse to the longitudinal direction LR of the cells of a accumulator pack AP1, AP2. However, it should be noted that the principle described here is also valid, i.e. an anomaly indicating tampering can be detected if the curve is examined at an angle (i.e. oblique) to the longitudinal direction LR.

In any case, in the lower part of FIG. 3 it can be seen for the left accumulator pack AP1 that the attenuation curve $D(r)$ increases as expected from the cell edges towards the center M of the accumulator pack AP1 and decreases from the center M towards the cell edge.

For the fake cells FZ of the second accumulator pack AK2 on the right in the lower part of FIG. 3 it can be seen that the attenuation curve $D(r)$ at the cell edges R1, R2 of the fake cells FZ has a characteristic peak P1, P2 in respective local maximum values Dmax1 and Dmax2, i.e., a clear step (jump), and then the attenuation curve $D(r)$ decreases visibly towards the center M of the accumulator pack AP2 and the fake cell FZ or runs visibly at a significantly lower level. This is abnormal compared to the attenuation curve $D(r)$ of the real lithium cells LZ and is described here as a possible characteristic anomaly for the detection of fake cells FZ.

In a first consideration based on the construction of typical fake cells it was an approach to try to extract metal parts from the X-ray data in the area of recognized battery cells. However, even in simple scenes, this proved to be extremely difficult due to disturbances of the X-ray signal attenuated by the organic material. The solution proposed and discussed here uses exactly the metal portion of a fake cell to detect an anomaly caused by it (anomaly detection), which also works in difficult scenes. A particularly difficult scene to detect are battery cells in a built-in electronic device, such as a laptop, which is placed in a bag together with many other objects.

Figure 4A:
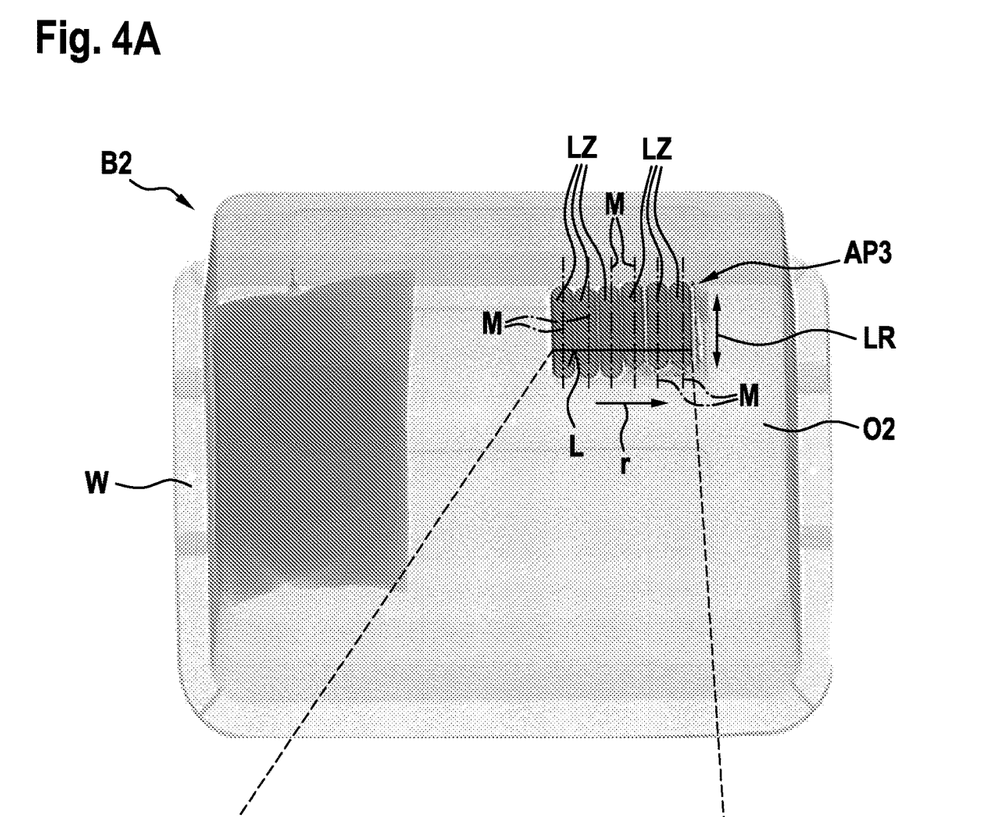
FIG. 4 shows another example of the attenuation curve along a line through non-tampered with lithium cells.
Figure 4B:
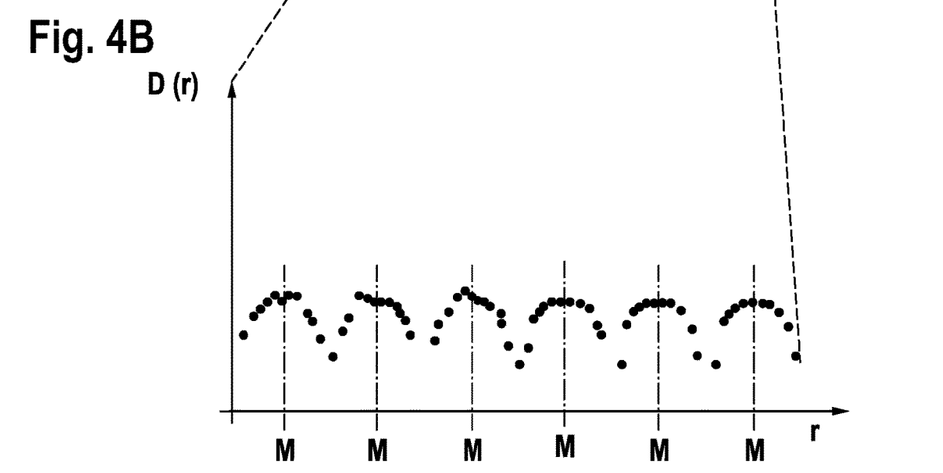

FIGS. 4 and 5 each show a further example of the principle proposed here, so FIGS. 4 and 5 are not explained in detail but only in the essential points.

In the upper part of FIG. 4 a second x-ray image B2 shows a tray W as second inspection object O2. In the tray W there is a third accumulator pack AP3 with six real, i.e. not tampered, lithium cells LZ arranged side by side.

In the lower part of FIG. 4 the attenuation curve $D(r)$ for the X-ray radiation along the line L in the upper part of FIG. 4 is shown by the third accumulator pack AP3 with the location variable r. The expected attenuation curve $D(r)$ across the six lithium cells LZ is clearly visible. The attenuation increases from the cell edge to the cell center M, where the X-ray radiation have to pass through most of the metallic cell material and decreases again from there to the edge.

In the upper part of FIG. 5 there is a third X-ray image B3 of a box BO as third inspection object O3. The box BO contains a laptop LT as an example of a mobile device, which contains a fourth accumulator pack AP4 with 9 accumulator cells arranged side by side. Three of the accumulator cells were tampered to hide an organic material inside the cells. These cells are fake cells FZ.

In the lower part of FIG. 5 the attenuation curve D(r) for the X-ray radiation along the line L through the fourth accumulator pack AP4 with the location variable r in the upper part of FIG. 5 is shown again transverse to the longitudinal direction LR fake cells FZ. The expected attenuation curve D(r) across the fake cells FZ is also clearly visible here. The attenuation has a peak at the respective cell edges R and decreases from the respective cell edge R to the respective cell center M of the respective fake cell FZ and increases again starting from the respective center M of the fake cell FZ to the edge R.

Based on the findings explained above in FIGS. 3-5, fake cells FZ can be reliably detected automatically by means of a detectable anomaly.

Figure 6A:
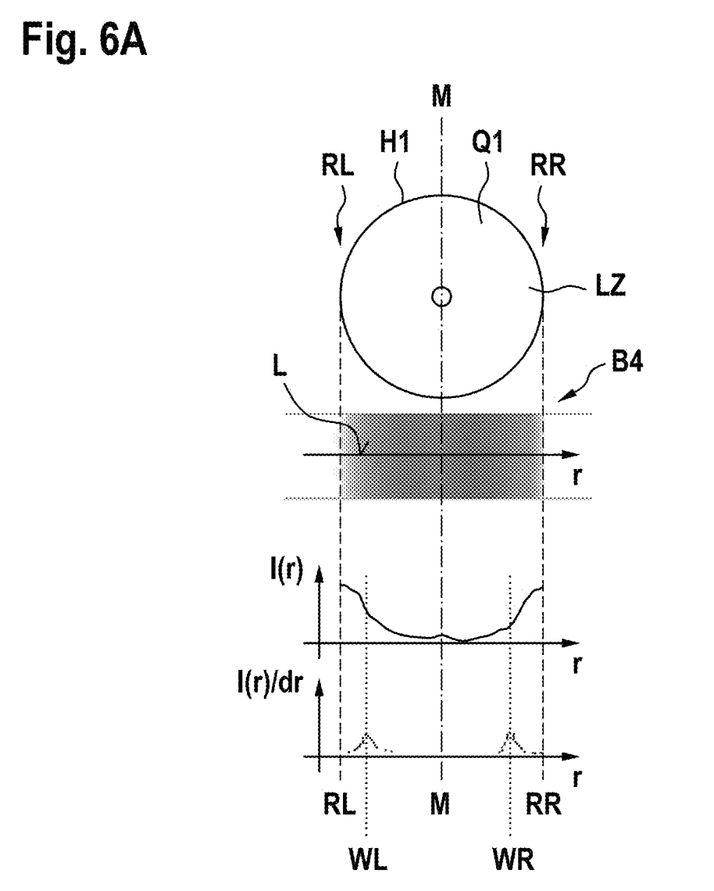
FIG. 6A shows from top to bottom a simplified cross-section of a non-tampered with lithium cell, below a section of a 2D X-ray image of the lithium cell, below the intensity curve of detected X-ray radiation along a line through the X-ray image and below the curve of the derivative of the intensity curve by the location variable.

FIG. 6A shows from top to bottom a simplified cross-section Q1 of an non-tampered lithium cell LZ, below a section of a 2D X-ray image B4 of the lithium cell LZ, below it the intensity curve I(r) along the line L through the X-ray image B4 and below it the curve of the derivation of the intensity curve I(r) by the location variable (r).

The non-tampered lithium cell LZ of FIG. 6A has a thin metal sheath H1, while the interior is filled basically evenly up to the center M with the functional materials of the lithium cell LZ with a high metal content. This results in an intensity curve I(r) starting from the right edge RR or the left edge RL towards the center M of the non-tampered lithium cell LZ with intensity values decreasing towards the center. Since the attenuation for the X-ray radiation is essentially determined by the thickness of the material to be passed through and the cross section Q1 is circular and thus becomes thicker towards the center, a typical "signature" is produced in the course of the first derivative of the detected intensity curve I(r) of the X-ray radiation. The first derivative $dI(r)/dr$ of the intensity curve I(r) shows a peak at a left inflection point WL and a right inflection point WR of the intensity curve I(r), which is not located at the edge or in the peripheral area of the lithium cell LZ. Thus, with the findings presented here, even non-tampered lithium cells LZ can be positively detected or confirmed.

Figure 6B:
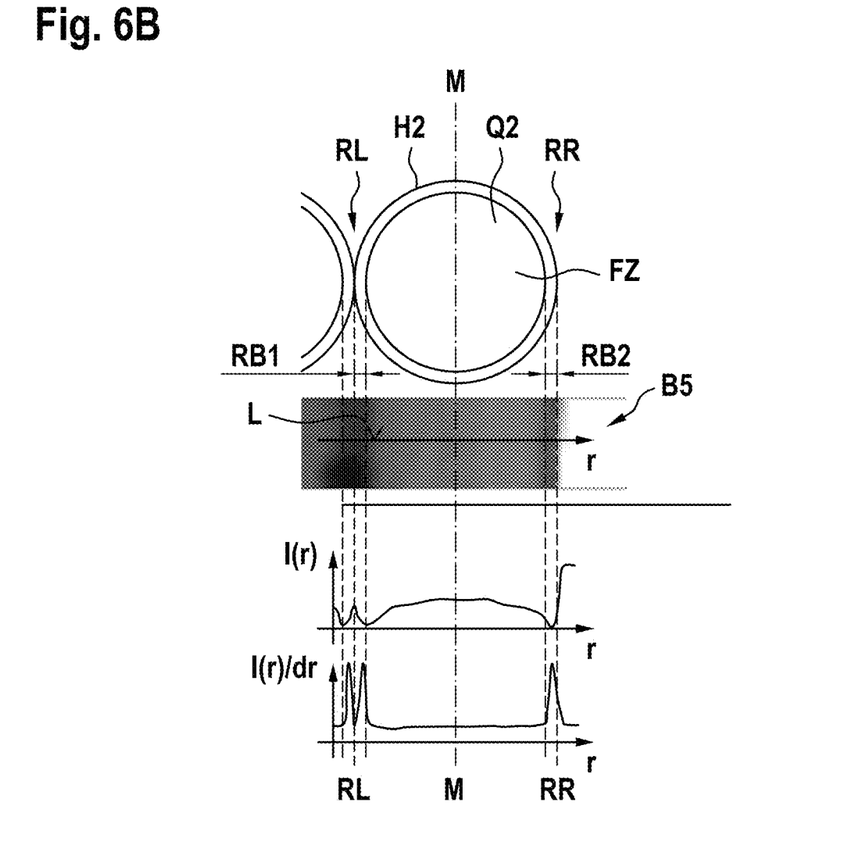
FIG. 6B shows from top to bottom a simplified cross-section of two tampered with lithium cells, i.e. fake cells, lying next to each other, below a section from a 2D X-ray image of the fake cells, below the intensity curve along a line through the X-ray image and below the curve of the derivation of the intensity curve by the local variable.

FIG. 6B shows a simplified cross section Q2 of two tampered lithium cells lying next to each other, i.e. fake cells FZ, from top to bottom. Below this is a section from a 2D X-ray image B5 of these fake cells FZ, below this is the intensity curve I(r) along the line L through the X-ray image B5 and below this is the curve of the derivative $dI(r)/dr$ of the intensity curve I(r) according to the location variable (r).

The tampered fake cells FZ of FIG. 6B have a thicker metal sheath H2 compared to the thin metal sheath H1 of FIG. 6A, while the interior is filled basically uniformly up to the center M with an organic material (e.g. explosives) concealed in the fake cell FZ. The thickness of the metal sleeve H2 defines a left edge area RB1 and a right edge area RB2.

As noted elsewhere, the edge area is defined as an area that extends from the edge RL, RR of cell FZ towards the center M of cell FZ and whose thickness is at most about 10% of the distance from the edge RL, RR to the center M; this definition applies to all examples.

In the case of the fake cell, there is a significant drop in the intensity I(r) in the right-hand edge area RB1 and in the left-hand edge area RB2 in comparison with the non-tampered lithium cell LZ of FIG. 6A. Due to the lower attenuation properties of the organic material, the intensity of the detected X-ray radiation is almost uniform towards the center M of the fake cell FZ, since the total (effective) thickness of the metal sleeve H2 through which the X-ray radiation pass hardly changes in essence. This results in a significantly different signature for the fake cell FZ in the first derivative of the intensity I(r). Particularly significant are the clearly recognizable peaks in the edge areas RB1, RB2, which are located at the edge of the cell and thus clearly in the edge area of the cell compared to the peaks at the inflection points WL, WR in FIG. 6A, while the inflection points are clearly closer to the center of a non-tampered lithium cell LZ.

Figure 3A:
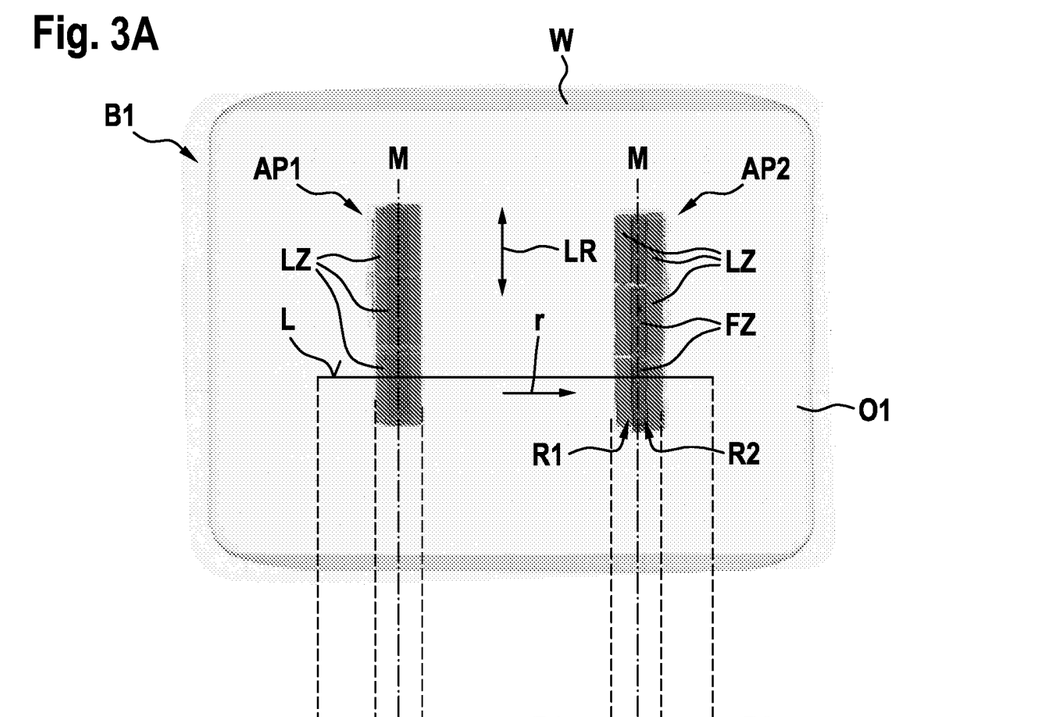
FIG. 3 shows a comparison of the attenuation curve of X-ray radiation along a line through real lithium cells (left) and through tampered lithium cells, so-called fake cells (right) to illustrate and explain the principle proposed here for detecting fake cells.
Figure 3B:
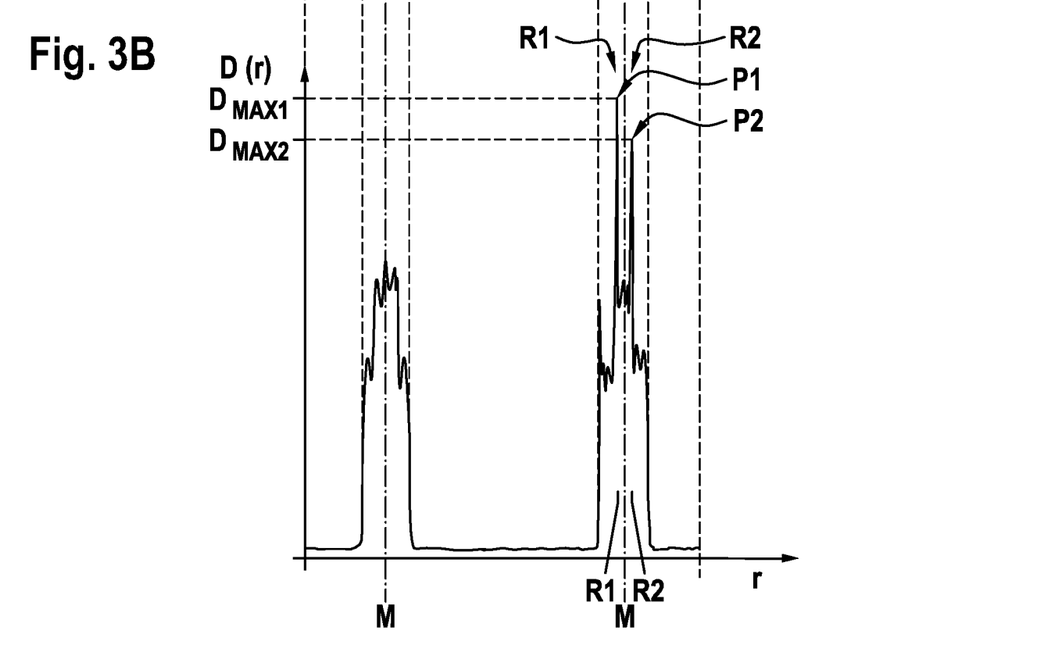
Figure 5A:
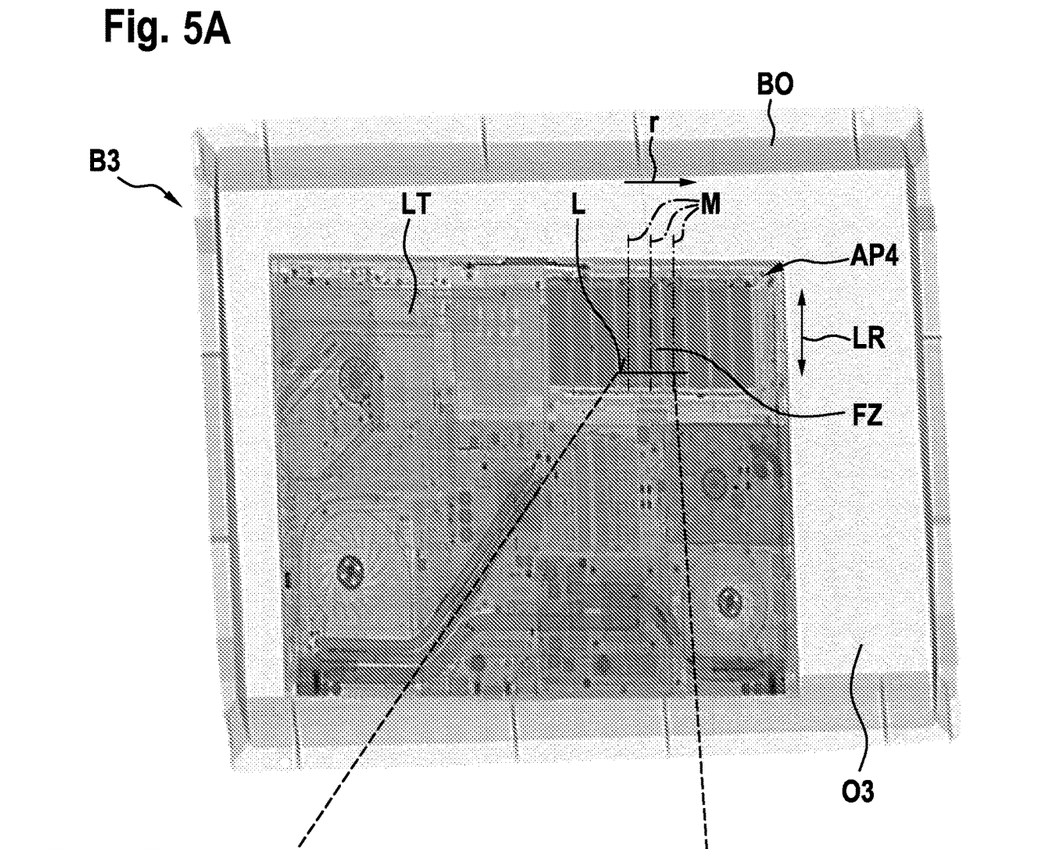
FIG. 5 shows another example of the attenuation curve across fake cells installed in a laptop.
Figure 5B:
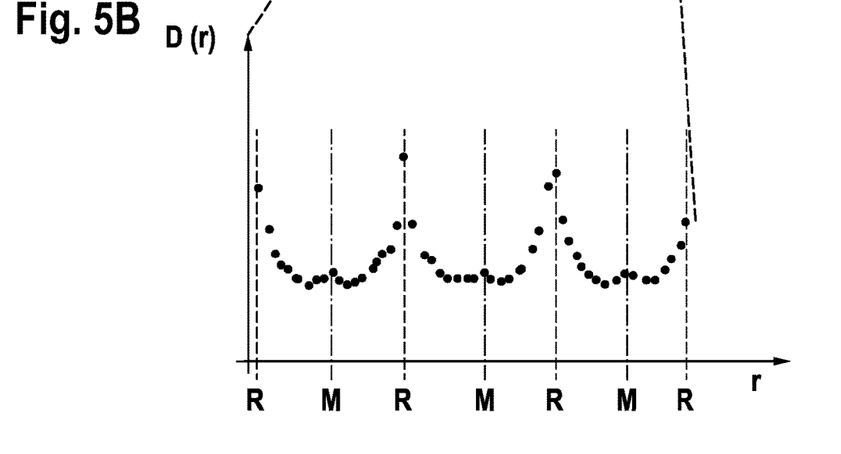
Figure 7:
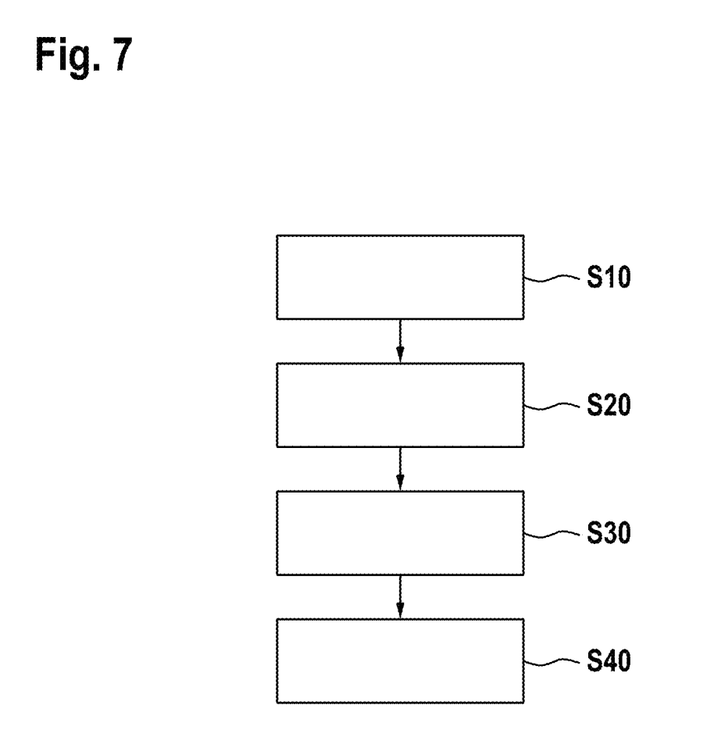
FIG. 7 shows a flowchart of a method for finding fake cells in inspection objects according to the disclosure.

FIG. 7 shows a flowchart of a procedure for finding a tampered metal item, such as a fake cell FZ of FIGS. 3A and 5A, in which a non-metallic substance, e.g. explosives, is hidden in two-dimensional X-ray data of an inspection object O1 or O3 containing the metal item FZ. To this effect, the method has the following steps.

A step S10 with determining an area containing the metal item FZ in the X-ray data. Then a step S20 providing an attenuation curve I(r) across the metal item FZ from the X-ray data (see FIGS. 3A-5B). Then a step S30 with evaluating whether the attenuation curve I(r) at edges R1, R2 of the metal item FZ shows a characteristic anomaly P1, P2 (see FIGS. 3B, 4B, 5B). Finally, a step S40 with if the attenuation curve I(r) at edges R1, R2 of the metal item FZ shows the characteristic anomaly P1, P2, triggering an alarm function.

The alarm function can have at least one of the following steps:

(i) overlaying the attenuation curve I(r) as well as the line along which the attenuation curve I(r) is present on an X-ray image B1, B2, B3 of the inspection object O1, O2, O3 in order to enable an operator to make a better visual evaluation;

(ii) triggering a manual inspection of the inspection object O1, O2, O3 by automatically controlling the device in such a way that the inspection object in question is automatically removed from the access of third parties and transferred to a follow-up inspection point.

(iii) triggering a visual and/or acoustic alarm at an inspection device 200 where the procedure is applied. This can also ensure the attention of the operator and other security personnel.

Finally, it should be noted that the principle of the disclosure is not limited to the detection of fake cells FZ containing explosives. Rather, the principle is applicable to the detection of any tampered metallic items in which an organic material has been concealed. This can also involve drugs, for example. In the following we will therefore not speak restrictively of fake cells, but of fake items.

The core idea of the disclosure is to apply the above mentioned findings to the detection of metallic fake cells in an X-ray inspection method, in particular in an evaluation method for the detection of fake cells in a transmission image of an inspection object, such as a two-dimensional X-ray image.

What is claimed is:

1. A method for detecting a tampered metal item in which a non-metallic substance is concealed and which has been tampered with such that the tampered metal item produces a two-dimensional X-ray image comparable to a corresponding non-tampered metal item, in two-dimensional X-ray data of an inspection object containing the metal item, the method comprising:

determining an area containing a metal item in the X-ray data; providing an attenuation curve for or intensity curve of detected X-ray radiation along a line through the metal item from the X-ray data;

evaluating whether the attenuation curve or the intensity curve shows a characteristic anomaly in a predetermined area, and if the attenuation curve or the intensity curve shows the characteristic anomaly in the predetermined area, triggering an alarm function.

2. The method according to claim 1, wherein determining the area containing the metal item in the X-ray data comprises:

determining that an area in the X-ray data comprises metal based on whether the area causes a minimum attenuation of X-ray radiation and/or on what atomic number or effective atomic number is assigned to a material in the X-ray data.

3. The method according to claim 1, wherein providing the attenuation curve or intensity curve along the line through the metal item from the X-ray data comprises:

determining a longitudinal direction of the metal item; and establishing the attenuation curve or intensity curve for a location variable along the line through the metal item.

4. The method according to claim 3, wherein the line is set up such that the line runs orthogonal to the determined longitudinal direction.

5. The method according to claim 1, wherein evaluating whether the attenuation curve or correspondingly for the intensity curve in the predetermined area shows a characteristic anomaly, comprises at least one of: determining whether the value of the attenuation increases along the attenuation curve from the edge of the metal item towards the center of the metal item; determining whether the attenuation curve has a step at the edges or in the edge areas of the metal item; determining whether the attenuation curve in the edge areas of the metal item has a attenuation maximum and, based thereon, decreases towards the center of the metal item and/or runs at a lower level compared to the edge areas; and determining a first derivative of the attenuation curve according to the location and determining whether the derivative shows a peak in each of the edge areas of the metal item.

6. The method according to claim 1, wherein triggering an alarm function comprises at least one of:

overlaying the attenuation curve or the intensity curve as well as the line along which the attenuation curve or the intensity curve is present into an X-ray image of the inspection object;

triggering a manual inspection of the inspection object; and triggering of an optical and/or acoustic alarm on an inspection system on which the method is applied.

7. The method according to claim 1, wherein the tampered metal item is an item with a metal sleeve or metal cover.

8. The method according to claim 1, wherein the tampered metal item is a tampered accumulator cell or battery cell.

9. The method according to claim 8, wherein the tampered metal item is a tampered lithium accumulator cell.

10. A processing device for evaluating transmission images, wherein the processing device is adapted to perform a method according to claim 1.

11. A processing device according to claim 10, wherein the processing device is further connected to an output unit, and wherein the output unit is adapted to perform an alarm function.

12. A processing device according to claim 10, wherein the processing device has a communication interface by which the processing can be networked with one or more inspection apparatuses for non-destructive inspection of inspection objects for data communication to receive from the one or more inspection devices transmission images for visual evaluation by the data communication.

13. An inspection device set up for transporting inspection objects through an inspection device, for carrying out an imaging inspection method for non-destructive inspection of the inspection objects and for providing transmission images of the inspection objects to a processing device according to claim 10, the inspection device connected to the processing device for data communication.

14. An inspection system including the processing device, which is spatially separated from and connected to the inspection device according to claim 13 for data communication, wherein transmission images of inspection objects inspected at the inspection device are transmitted to the processing device for visual evaluation.

* * * * *